Jan. 13, 1931. G. W. FENIMORE 1,788,511
PERPETUAL CALENDAR
Filed Oct. 1, 1928 3 Sheets-Sheet 1
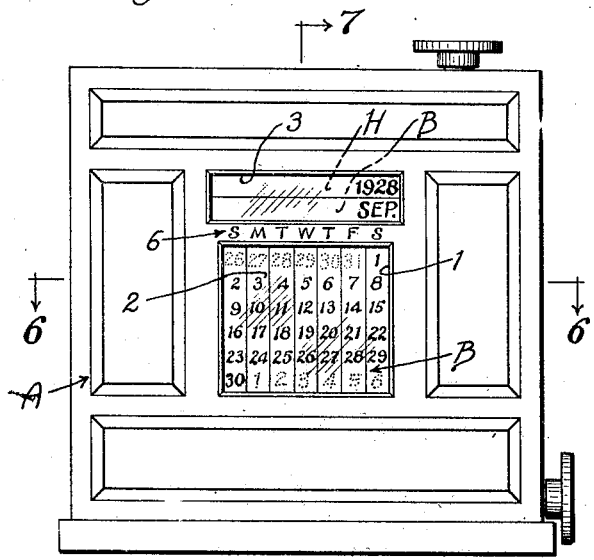
Fig. 4
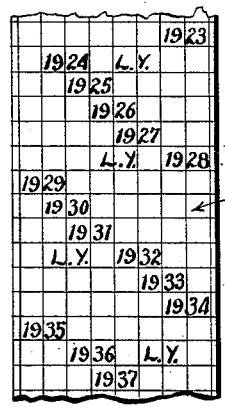
Fig. 3
Fig. 1
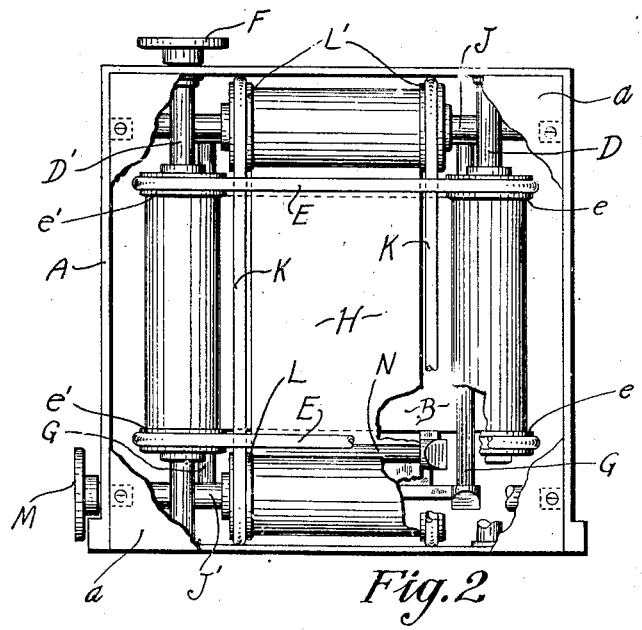
Fig. 2
INVENTOR.
George W. Fenimore
BY
ATTORNEYS Jan. 13, 1931.                    G. W. FENIMORE                    1,788,511
                                 PERPETUAL CALENDAR
                               Filed Oct. 1, 1928            3 Sheets-Sheet 2

Fig.5

INVENTOR.
George W. Fenimore
BY
ATTORNEYS.

Jan. 13, 1931.　　G. W. FENIMORE　　1,788,511
PERPETUAL CALENDAR
Filed Oct. 1, 1928　　3 Sheets-Sheet 3
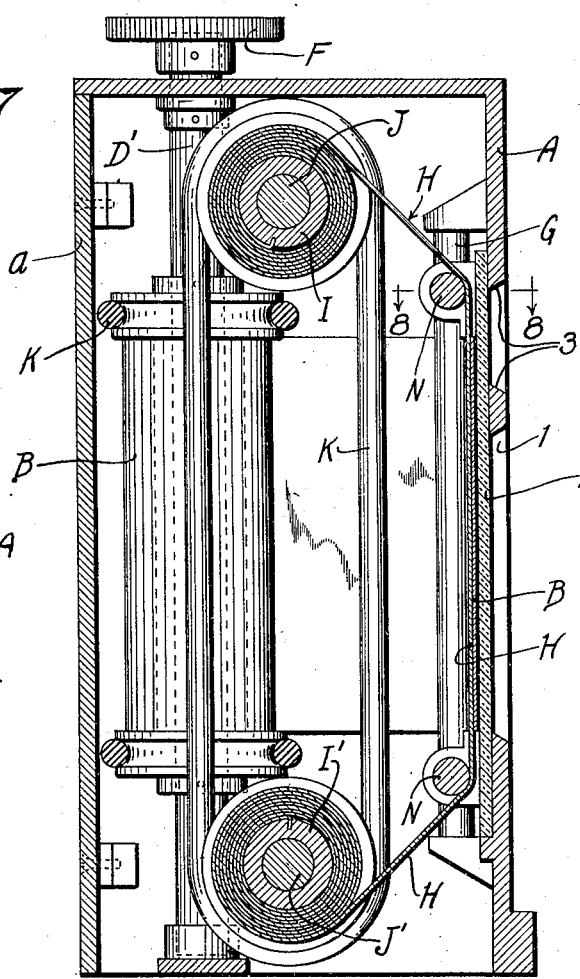
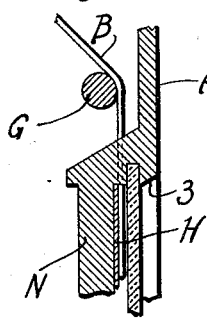
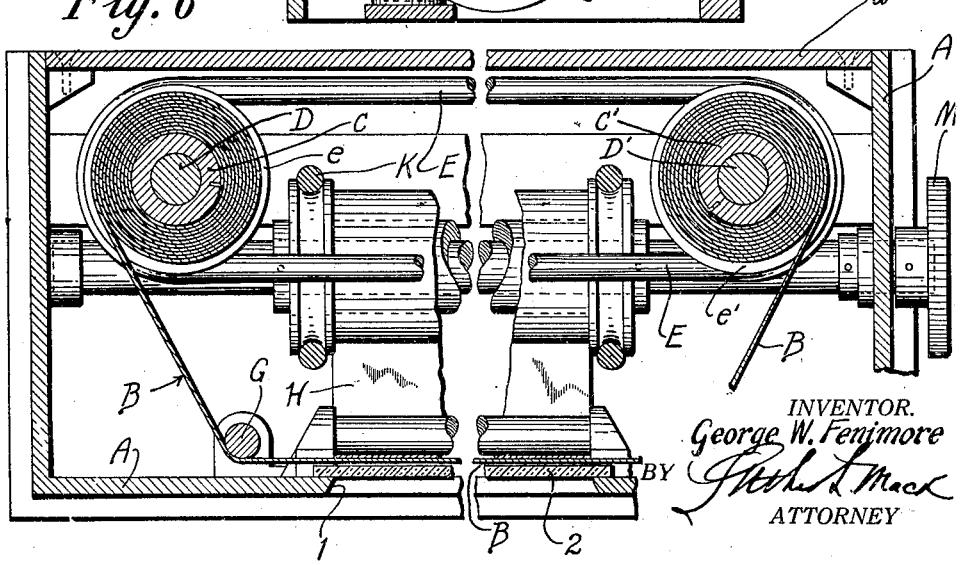
INVENTOR.
George W. Fenimore
BY
ATTORNEY Patented Jan. 13, 1931

1,788,511

UNITED STATES PATENT OFFICE

GEORGE W. FENIMORE, OF LOS ANGELES, CALIFORNIA

PERPETUAL CALENDAR

Application filed October 1, 1928. Serial No. 309,459.

This invention relates to and has for a primary object the provision of a perpetual calendar embodying a surface having fixed days of the week designations thereon and means for moving groups of numerals and/or characters representing years, months and days of the month relative to and for retaining the same in selected positions representative of a selected calendar month in any given year within the range of the calendar.

The invention comprehends the employment of a plurality of groups of numerals— one for each month of a calendar year and two additional groups for the months of January and February for leap years.

Each of the months groups is composed of 13 vertical columns of numerals arranged for registration with the days of the week designations on the face of the calendar, and the several groups are arranged in sequence from January to December so that they will correspond to provide a calendar for any year.

Another object is to provide the names of the months in central positions with respect to the several month groups of numerals, and to additionally provide year designations also movable with respect to the month and days of the week designations, together with means for adjusting the several groups of numerals and year designations to represent any selected calendar month.

A more detailed object is to provide a calendar provided with days of the week designations on the face thereof and independently adjustable members provided respectively with the month, and days of the month designations, and the year designations.

Other objects may appear as the description progresses.

In the accompanying drawings I have shown a suitable form of perpetual calendar for carrying out the hereinabove named objects of invention, but it will be understood that the form of device shown is optional and arbitrary and other forms may be provided within the scope of the appended claims without departing from the spirit of my invention.

In said drawings,

Fig. 1 is a front elevation of a desk type perpetual calendar constructed in accordance with my invention.

Fig. 2 is a rear elevation of the same with the back broken away to show the operating mechanism.

Fig. 3 is a fragmentary view of a strip of paper, celluloid, or the like, upon which is printed or formed the years included in the range of a calendar and arranged in a peculiar way for purposes hereinafter shown.

Fig. 4 is a fragmentary view of a strip of material on which is shown groups of numerals representing the months of February and January for leap years.

Fig. 5 is a composite view of a continuation of the strip of material shown in Fig. 4, showing all of the months of a calendar year with groups of numerals representing the days of the month.

Fig. 6 is an enlarged sectional plan on line 6—6 of Fig. 1.

Fig. 7 is a sectional elevation of the same on line 7—7 of Fig. 1.

Fig. 8 is a fragmentary section of the same on line 8—8 of Fig. 7.

Briefly described, the form of calendar shown may have a suitable base A of metal, bakelite, or other material, with a detachable back $a$ suitably attached thereto. The face of the base is provided with a main opening 1 in the center thereof which is closed by a sheet of glass, mica, or other transparent element 2.

Above the opening 1 I also provide a narrow opening 3 which may be covered by the sheet of glass 2 or by another separate piece of glass. The month designation strip B is horizontally disposed in the base A so that it may be moved horizontally back of the opening 1 and the groups of numerals thereon may be visible through the glass 2, while the names of the months may be visible through the lower portion of the opening 3, as shown in Fig. 1.

The month designation strip B is suitably attached at its ends respectively to reels C and C' which are rotatably mounted on vertical shafts D and D' respectively.

The shafts D and D' are operably connected by means of one or two continuous belts, as at E, which operate over pulleys e and e' fixed to the shafts E and D' respectively. One of said shafts, as at D' in Fig. 2, may be extended through the top of the base A and provided above the top thereof with an operating knob F so that when said knob is rotated the month designation strip B will be moved horizontally behind the glass 2 and opening 1, as shown. Said strip B is preferably guided in its horizontal movement by means of a pair of rotatable pins or rollers, as at G, mounted on opposite sides of the opening 1, as shown in Fig. 6.

It will be understood at this point that when the strip B is moved by turning the knob F it is unwound from one of the reels and is at all times stretched taut over the reels and the guides G so that the printed face of the strip will move in a plane close to, if not actually in contact with, the rear side of the glass 2.

The strip B is subdivided into 14 groups of numerals, as at 5, 5 etc., with the names of the months in abbreviated form, preferably printed at the tops of the groups and in the exact centers thereof. It will be noted that there are 13 vertical columns of numerals in each of the months, and that the first day of each month is in a different column than the first day of each of the other months, unless in a given year the first days of any two or more months should fall on the same days of the week. The vertical columns in each of the groups 5 correspond to and are adapted to register with the initials of the days of the week, as at 6, formed on the face of the base A, preferably between the openings 1 and 3. Thus, as the strip B is moved horizontally relative to the days of the week designations 6, selected columns of numerals in the groups 5 may be moved into proper relation with the days of the week designations.

As shown in Fig. 5, referring particularly to the December group, I may print the last days of the preceding month and the first days of a succeeding month at the beginning and end respectively of the groups 5, but in a different color or type, as indicated by figures formed of dotted lines.

The numerals in the groups 5 are so arranged that any possible arrangement of days of the month is provided for association and registration with the days of the week designations 6 to comprehend the use of the calendar for any year within a predetermined range.

Referring to Fig. 4, it will be noted that a slight difference in the arrangement of the groups 5 is necessary to provide for leap years, it being understoood that the only months affected by leap years are January and February, and for this purpose the two extra groups shown in Fig. 4 are provided.

A year strip H is provided in the calendar, as shown in Fig. 3, which has printed thereon a graduated and inclined scale of numerals representing the plurality of years included in the range of a particular calendar, together with separate designations for the leap years, as at "L. Y.". The year designations on the strip H are closely spaced apart vertically on the strip, and successive years are horizontally spaced apart to correspond to the columns of numerals in the groups 5. The year designation strip H is mounted similarly to the month designation strip B on reels I and I', which are carried on vertical shafts J and J'. Said shafts are operably connected together by means of one or more belts K which operate pulleys L on the shaft J' and L' on the shaft J.

The lower shaft J' is preferably extended through a side of the casing and is provided with an operating knob M, whereby the shafts J and J' may be rotated to a corresponding extent for moving the strip H vertically behind the opening 3 and the strip B, as shown in Fig. 7.

The strip H may be guided in its vertical movement adjacent the opening 3 by means of rollers or pins N, N mounted above the opening 3 and below the opening 1. Thus, as the knob M is turned the year strip H will be moved vertically in a manner similar to the movement of the strip B.

By reference to Fig. 1, it will be observed that the calendar month shown through the openings 1 and 3 represents the month of September in the year 1928, and it will be noted that the first day of the month of September would fall on Saturday. Thus, when the strip B is adjusted so that the column including the first day of the September group is moved into position below the letter "S", representing Saturday on the face of the calendar, the seven vertical columns of numerals representing the September calendar will be properly positioned below the other days of the week designation.

Movement of the year designation strip H so that the year "1928" will appear through the glass 2 in the upper portion of the opening 3 designated the position of the month designation "Sep". In other words, to adjust the calendar for any particular month in a given year, the year strip H is first moved so that the proper year will be visible at the top of the calendar. Thereafter the month strip B is moved to the right or left until the month designation registers vertically with the year designation, and the movement of the strip B to such position definitely fixes the vertical columns of numerals representing the days of the month in the groups 5 relative to the fixed days of the week designation.

As in the case of the strip B, the year designation strip H may also be made continuous so as to run over rollers on the shafts J and J', or other means than the belts K may be employed for operably connecting the reels I and I'.

Having thus described my invention, what I claim is:

1. A perpetual calendar embodying a supporting member having an apertured face with fixed days of the week designations thereon, a monthly designation strip horizontally movable adjacent an aperture of said face and provided with groups of numerals representing the days of the month, and a month designation for each of said groups of numerals, said days of the month designations including certain numerals for indicating the days of the current month, and other numerals preceding and succeeding the days of the current month and representing days of the preceding and succeeding months, the month designations being in predetermined fixed position relative to said groups of numerals, and a year designation strip also movable adjacent an aperture of said face and at right angles to the month designation strip, the year designations being arranged in predetermined fixed position for registration with the month designations in order to indicate a given calendar month.

2. A perpetual calendar including a supporting member having an apertured face with fixed days of the week designations thereon, a month designation strip movable horizontally adjacent an aperture of said face, and provided with a separate group of numerals of each month of a calendar year arranged in longitudinal sequence on said strip for indicating the days of the month, said strip having month designations in predetermined fixed positions thereon relative to said days of the month designations, and a year designation strip movable at right angles to the month designation strip and adjacent an aperture of said face and provided with year designations arranged in different positions thereon corresponding to the month designations on said month designation strip whereby on the movement of the year and month designation strips into predetermined positions a calendar for a given month and year will be visible thru the apertures of said face when the year and month designations are in registration.

3. A perpetual calendar including a supporting member having an apertured face with days of the week designations thereon, a month designation strip having the names of the months of a calendar year arranged in regular order thereon and groups of numerals associated with said names of the months representing days of the month arranged in horizontal rows and vertical columns, means for moving said month designation strip relative to the apertured face for exposing different month designations and different days of the month numerals, said groups of numerals being arranged to provide progressively different combinations of numerals for each of the months, a year designation strip movable at right angles to the month designation strip and having the year designations thereon arranged in different positions transversely of the strip to correspond to the particular month and days of the month combinations of the calendar month with which said years are associated, whereby when the year and month designations are arranged one above the other the days of the week designations will correspond to that month and year.

GEORGE W. FENIMORE.